United States Patent
Ozawa et al.

(10) Patent No.: US 9,482,292 B2
(45) Date of Patent: Nov. 1, 2016

(54) PISTON-INTEGRATED SEAL

(71) Applicant: NOK CORPORATION, Tokyo (JP)

(72) Inventors: Kentaro Ozawa, Fukushima (JP);
Kiichiro Goto, Fukushima (JP)

(73) Assignee: NOK Corporation (JP)

( * ) Notice: Subject to any disclaimer, the term of this patent is extended or adjusted under 35 U.S.C. 154(b) by 0 days.

(21) Appl. No.: 14/892,305

(22) PCT Filed: Oct. 29, 2013

(86) PCT No.: PCT/JP2013/079187
§ 371 (c)(1),
(2) Date: Nov. 19, 2015

(87) PCT Pub. No.: WO2014/188616
PCT Pub. Date: Nov. 27, 2014

(65) Prior Publication Data
US 2016/0091033 A1    Mar. 31, 2016

(30) Foreign Application Priority Data

May 24, 2013    (JP) ................................ 2013-109509

(51) Int. Cl.
*F16J 15/32*    (2016.01)
*F16D 25/12*    (2006.01)
*F16D 25/0638*    (2006.01)

(52) U.S. Cl.
CPC ........... *F16D 25/12* (2013.01); *F16D 25/0638* (2013.01); *F16J 15/3204* (2013.01); *F16J 15/3232* (2013.01); *F16D 2300/08* (2013.01)

(58) Field of Classification Search
CPC .............. F16J 15/3204; F16J 15/3268; F16D 2125/08; F16D 25/12
See application file for complete search history.

(56) References Cited

U.S. PATENT DOCUMENTS 5,172,793 A * 12/1992 Temple ................... F16D 65/18
188/322.18
5,865,442 A * 2/1999 Iwashita .............. F16J 15/3252
277/436

(Continued)

FOREIGN PATENT DOCUMENTS

DE    19839502 A1    3/2000
DE    10222933 A1    12/2003

(Continued)

OTHER PUBLICATIONS

Extended European Search Report for EP Application No. 13885064.9 dated Mar. 21, 2016 (8 pages).

*Primary Examiner* — Gilbert Lee
(74) *Attorney, Agent, or Firm* — Harness, Dickey & Pierce, P.L.C.

(57) ABSTRACT

A piston-integrated seal has a seal lip integrally provided in a clutch piston of a hydraulic clutch and directed to a hydraulic chamber side. In the seal lip, a main seal edge portion in a hydraulic chamber side and a sub seal edge portion in an anti-hydraulic chamber side are formed in a sliding portion in relation to the other sliding surface. In the main seal edge portion and the sub seal edge portion, an angle of an inclined surface in the hydraulic chamber side is smaller than an angle of an inclined surface in the anti-hydraulic chamber side in a un-installed state, and the angle of the inclined surface in the hydraulic chamber side in relation to the other sliding surface is approximately equal to the angle of the inclined surface in the anti-hydraulic chamber side in an installed state, thereby reducing friction difference in a sliding direction.

4 Claims, 5 Drawing Sheets

(56) References Cited

U.S. PATENT DOCUMENTS

| | | | |
|---|---|---|---|
| 5,899,461 A | 5/1999 | Yomogita | |
| 6,039,160 A * | 3/2000 | Joppeck | F16D 25/0638 192/52.5 |
| 6,543,783 B1 | 4/2003 | Freitag et al. | |
| 7,156,399 B2 * | 1/2007 | Lou | F16J 15/324 277/436 |
| 9,194,496 B2 * | 11/2015 | Pecak | F16D 25/0638 |
| 2004/0251107 A1 | 12/2004 | Sefcik et al. | |
| 2005/0272508 A1 | 12/2005 | Matsui | |
| 2007/0251380 A1 * | 11/2007 | Kanzaki | F16D 25/0638 92/240 |
| 2010/0025937 A1 * | 2/2010 | Morishita | F16D 25/0638 277/549 |

FOREIGN PATENT DOCUMENTS

| | | |
|---|---|---|
| GB | 2156481 A | 10/1985 |
| JP | H08-184377 A | 7/1996 |
| JP | H09-210088 A | 8/1997 |
| JP | H09-292031 A | 11/1997 |
| JP | 2001-241467 A | 9/2001 |
| JP | 2011-149512 A | 8/2011 |
| JP | 2013-096503 A | 5/2013 |
| WO | WO-2004-023007 A1 | 3/2004 |
| WO | WO-2007-102411 A1 | 9/2007 |
| WO | WO-2012-024470 A1 | 2/2012 |
| WO | WO2012024470 A1 * | 2/2012 |

* cited by examiner

PISTON-INTEGRATED SEAL

CROSS-REFERENCE TO RELATED APPLICATIONS

This application is a U.S. National Stage Application of International Application No. PCT/JP2013/079187, filed on Oct. 29, 2013, and published in Japanese as WO 2014/188616 A1 on Nov. 27, 2014. This application claims priority to Japanese Application No. 2013-109509, filed on May 24, 2013. The entire disclosures of the above applications are incorporated herein by reference.

BACKGROUND OF THE INVENTION

1. Field of the Invention

The present invention relates to a piston-integrated seal which is used in a hydraulic clutch of an automatic transmission in a vehicle.

2. Description of the Conventional Art

Figure 4:
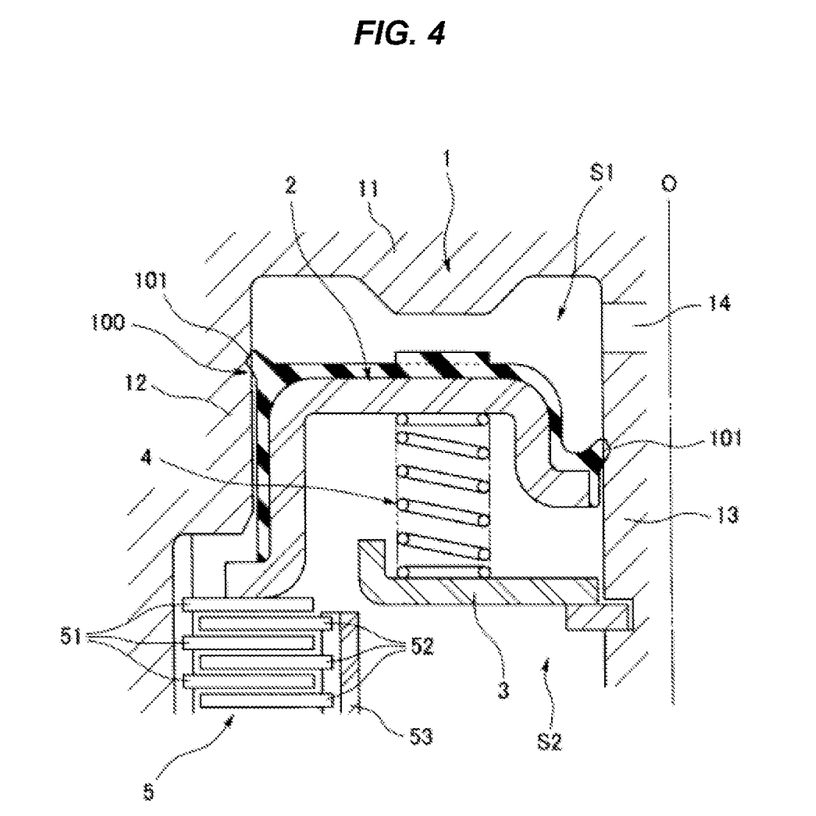
FIG. 4 is a one-side cross sectional view showing a conventional piston-integrated seal together with a part of a hydraulic clutch by cutting along a plane passing through an axis O.
Figure 5:
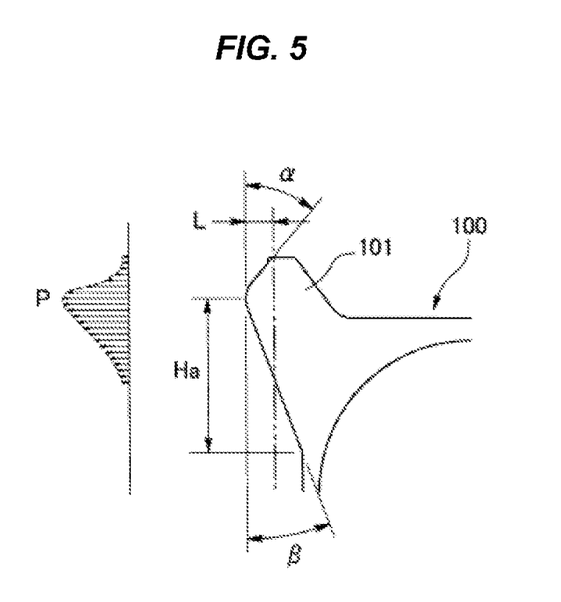
FIG. 5 is an explanatory view showing a part of the conventional piston-integrated seal.

FIG. 4 shows a hydraulic clutch which employs a conventional piston-integrated seal, and FIG. 5 shows an outline structure of the conventional piston-integrated seal.

First of all, in the hydraulic clutch shown in FIG. 4, reference numeral 1 denotes an annular clutch cylinder which rotates together with a drive shaft (not shown), reference numeral 2 denotes a clutch piston which is arranged within the clutch cylinder 1 so as to be movable in an axial direction, and defines a hydraulic chamber S1 between the clutch piston and an end plate portion 11 of the clutch cylinder 1, reference numeral 3 denotes a spring holder which is arranged in a space S2 in an opposite side to the hydraulic chamber S1 as seen from the clutch piston 2 and is locked its inner diameter to an inner tube portion 13 of the clutch cylinder 1, reference numeral 4 denotes a return spring which is interposed between the clutch piston 2 and the spring holder 3 in an appropriately compressed state, and reference numeral 5 denotes a multiple disc clutch constructed by a plurality of drive plates 51 which are locked to the clutch cylinder 1 side in a circumferential direction under a movable state in an axial direction, and a plurality of driven plates 52 which are locked to a clutch hub 53 provided in a driven shaft side in a circumferential direction under a movable state in an axial direction.

This kind of hydraulic clutch is structured such that the piston 2 displaces in an axial direction within the clutch cylinder 1 by applying a hydraulic pressure to the hydraulic chamber S1 via a pressure guide port 14 which is provided in the inner tube portion 13 of the clutch cylinder 1 or releasing the hydraulic pressure, thereby friction fastening the drive plate 51 and the driven plate 52 of the multiple disc clutch 5 or canceling the friction fastening so as to carry out a clutch connection and disconnection motion.

A packing such as an O-ring has been conventionally used as a seal means for inner and outer peripheries of the clutch piston 2, however, the clutch piston 2 is desired to be lowered its friction in order to achieve an improvement of fuel consumption and a reduction of shift shock (a shock generated at the friction fastening time of the clutch). In recent years, a piston-integrated seal 100 having seal lips 101 and 101 has been a mainstream, the seal lips 101 and 101 being slidably brought into close contact with the outer tube portion 12 and the inner tube portion 13 of the clutch cylinder 1 while being directed to the hydraulic chamber S1 side. In other words, the piston-integrated seal 100 is integrally formed in the clutch piston 2 by a rubber-like elastic material (a rubber material or a synthetic resin material having a rubber-like elasticity) (refer, for example, to Japanese Unexamined Patent Publication No. 2001-241467).

As shown in FIG. 5, the seal lip 101 is generally structured such that an angle α of an inclined surface closer to the hydraulic chamber S1 side than the seal edge portion where a contact pressure P (an interference L) in relation to the other sliding surface shown by a two-dot chain line in the drawing is the greatest is larger than an angle β of an inclined surface in an opposite side, and a length Ha in an axial direction from the seal edge portion to the root portion in the opposite side to the hydraulic chamber S1 is comparatively long.

SUMMARY OF THE INVENTION

Problem to be Solved by the Invention

However, according to the conventional piston-integrated seal 100, since the seal lip 101 has a directionality, a distribution of the contact pressure P is asymmetrical to each other in both sides of the maximum portion, and there is a tendency that the friction becomes greater at the stroking time of the clutch piston 2 to the clutch fastening canceling side (the hydraulic chamber S1 side) due to an energizing force of the return spring 4 when the hydraulic pressure of the hydraulic chamber S1 is released, in comparison with the stroking time of the clutch piston 2 to the clutch fastening side caused by applying the hydraulic pressure to the hydraulic chamber S1. As a result, it is hard to hydraulically control the hydraulic clutch, and there is a risk that a delay in shift change response is generated.

In order to improve the shift change response mentioned above, it is necessary to make a friction difference between the stroke to the clutch fastening canceling side (the hydraulic chamber S1 side) and the stroke to the clutch fastening side (the opposite side to the hydraulic chamber S1) small. Accordingly, reduction of the interference L and the rigidity of the seal lip 101 has been considered, however, there is a new problem that the pressure resistance and the durability of the seal lip 101 are lowered in this case.

Further, the friction can be reduced by forming a desired number of lubrication grooves in the sliding surface of the seal lip 101 (refer, for example, to Japanese Unexamined Patent Publication No. 9-210088). However, it has been insufficient to reduce the friction difference caused by the directionality of the seal lip 101.

The present invention is made by taking the above points into consideration, and a technical object of the present invention is to improve a shift change response of a hydraulic clutch by reducing a difference in friction due to a sliding direction caused by a directionality of a seal lip.

Means for Solving the Problem

As a means for effectively achieving the technical object mentioned above, a piston-integrated seal according to the invention of a first aspect has a seal lip which is integrally provided in a clutch piston of a hydraulic clutch and is directed to a hydraulic chamber side, the seal lip is structured such that a main seal edge portion in a hydraulic chamber side and a sub seal edge portion in an anti-hydraulic chamber side are formed in a sliding portion in relation to the other sliding surface, and the main seal edge portion and the sub seal edge portion are structured such that an angle of an inclined surface in the hydraulic chamber side is smaller than an angle of an inclined surface in the anti-hydraulic chamber side in a un-installed state, and the angle of the inclined surface in the hydraulic chamber side in relation to the other sliding surface is approximately equal to the angle of the inclined surface in the anti-hydraulic chamber side in an installed state.

A piston-integrated seal according to the invention of a second aspect is the structure described in the first aspect, wherein an interference of the sub seal edge portion is smaller than an interference of the main seal edge portion.

A piston-integrated seal according to the invention of a third aspect is the structure described in the first or second aspect, wherein the sub seal edge portion is positioned closer to the anti-hydraulic chamber side than a surface of a base portion in the hydraulic chamber side of the seal lip.

Effect of the Invention

On the basis of the piston-integrated seal according to the present invention, since the contact area with the other sliding surface is smaller by forming the main seal edge portion in the hydraulic chamber side and the sub seal edge portion in the anti-hydraulic chamber side, in the sliding portion of the seal lip, the friction can be reduced. Further, since the angle of the inclined surface in the hydraulic chamber side in relation to the other sliding surface is approximately equal to the angle of the inclined surface in the anti-hydraulic chamber side in the installed state (the contact state with the other sliding surface), it is possible to reduce the difference between the friction at the stroking time to the hydraulic chamber side and the friction at the stroking time to the anti-hydraulic chamber side. As a result, it is possible to improve the shift change response of the hydraulic clutch.

Further, according to the structure in which the interference of the sub seal edge portion is smaller than the interference of the main seal edge portion, since the deformation of the main seal edge portion can be absorbed by the sub seal edge portion, change in contact load of the main seal edge portion in relation to the other sliding surface can be suppressed regardless of change of the hydraulic pressure acting on the seal lip. As a result, it is possible to reduce the difference between the friction at the stroking time to the hydraulic chamber side and the friction at the stroking time to the anti-hydraulic chamber side.

Further, according to the structure in which the sub seal edge portion is positioned closer to the anti-hydraulic chamber side than the surface of the base portion in the hydraulic chamber side of the seal lip, since the deformation of the sub seal edge portion caused by applying the hydraulic pressure is suppressed, a seal lip deformation suppressing action by the sub seal edge portion is enhanced, and it is possible to improve the pressure resistance of the seal lip.

DETAILED DESCRIPTION OF PREFERRED EMBODIMENT

Figure 1:
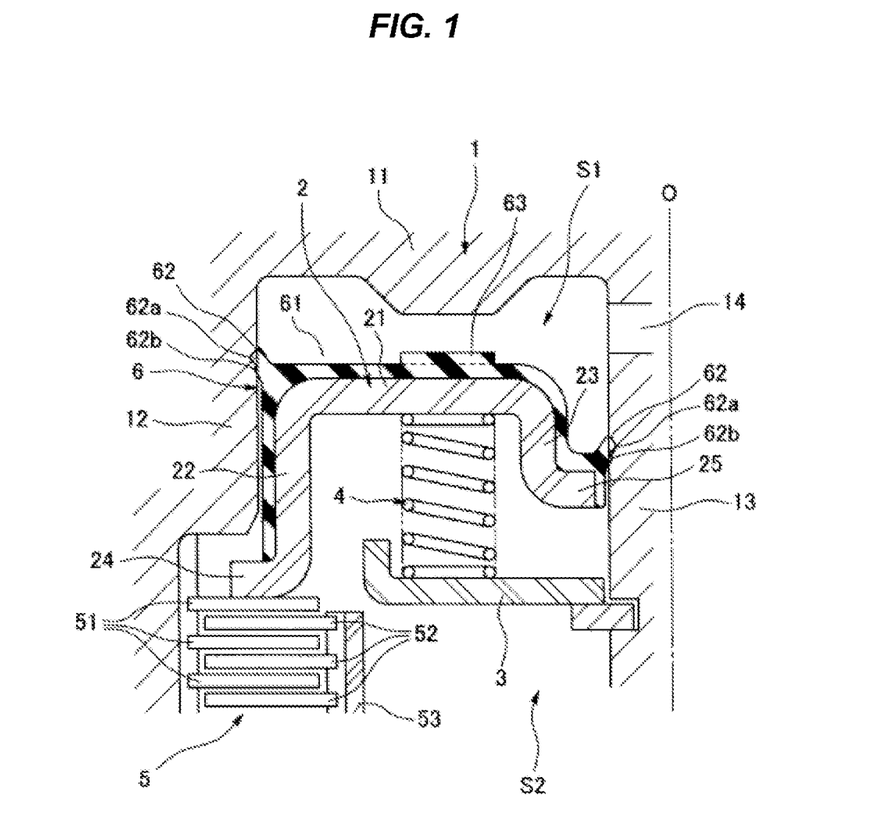
FIG. 1 is a one-side cross sectional view showing a preferable embodiment of a piston-integrated seal according to the present invention together with a part of a hydraulic clutch by cutting along a plane passing through an axis O.

A description will be given of a preferable embodiment of a piston-integrated seal according to the present invention with reference to the accompanying drawings. FIG. 1 is a one-side cross sectional view showing the piston-integrated seal according to the embodiment together with a part of a hydraulic clutch, reference numeral 1 denotes a clutch cylinder, reference numeral 2 denotes a clutch piston which is arranged within the clutch cylinder 1 so as to be movable in an axial direction and defines a hydraulic chamber S1 between the clutch piston and the clutch cylinder 1, reference numeral 1 denotes a spring holder which is arranged in a space (hereinafter, refer to as an anti-hydraulic chamber side space) S2 in an opposite side to the hydraulic chamber S1 as seen from the piston 2 and is locked to an inner tube portion 13 of the clutch cylinder 1 in its inner diameter portion, reference numeral 4 denotes a return spring which is interposed in an appropriately compressed state between the clutch piston 2 and the spring holder 3, and reference numeral 5 denotes a multiple disc clutch.

The clutch cylinder 1 has an end plate portion 11, and an outer tube portion 12 and an inner tube portion 13 which extend from an outer diameter and an inner diameter of the end plate portion, and is rotated around an axis O together with a drive shaft (not shown). Further, the inner tube portion 13 of the clutch cylinder 1 is provided with a pressure introduction port 14 for introducing a hydraulic pressure by an oil (ATF) to the hydraulic chamber S1.

The clutch piston 2 is a metal press molded product, and has a pressure receiving portion 21 which is faced to the end plate portion 11 of the clutch cylinder 1 in an axial direction, an outer tube portion 22 which extends from an outer diameter portion of the pressure receiving portion 21 to the anti-hydraulic chamber side space S2 side and faces to the outer tube portion 12 of the clutch cylinder 1 in a radial direction, and an inner tube portion 23 which extends from an inner diameter portion of the pressure receiving portion 21 to an opposite side to the hydraulic chamber S1 and faces to the inner tube portion 13 of the clutch cylinder 1 in a radial direction. A clutch pressing portion 24 is formed in a leading end portion of the outer tube portion 22 of the clutch piston 2, and an inward collar portion 25 is formed in a leading end portion of the inner tube portion 13 of the clutch piston 2.

The return spring 4 is structured such as to always energize the clutch piston 2 in a direction of reducing a cubic capacity of the hydraulic chamber S1 and is constructed by a coil spring. A plurality of return springs 4 are arranged at predetermined intervals in a circumferential direction.

The multiple disc clutch 5 is structured such that a plurality of drive plates 51 and a plurality of driven plates 52 are arranged alternately in an axial direction. The drive plates 51 are locked to the outer tube portion of the clutch cylinder 1 in a circumferential direction in a state in which the drive plates 51 can move in an axial direction, and the driven plates 52 are locked to a clutch hub 53 provided in a driven shaft side (not shown) in a circumferential direction in a state in which the driven shaft can move in an axial direction.

A piston-integrated seal 6 made of a rubber-like elastic material (a rubber material or a synthetic resin material having a rubber-like elasticity) is integrally provided in the clutch piston 2. The piston-integrated seal 6 has a base portion 61 which extends so as to cover an outer peripheral surface of the outer tube portion 22, a surface in the hydraulic chamber S1 side of the pressure receiving portion 21, an inner peripheral surface of the inner tube portion 23 and the inward collar portion 25 in the clutch piston 2, and seal lips 62 and 62 which are respectively positioned in the vicinity of an outer diameter portion of the pressure receiving portion 21 and an inner diameter of the inward collar portion 25 and are formed so as to extend from the base portion 61 to the hydraulic chamber S1 side. The seal 62 lip in the outer peripheral side is slidably brought into close contact with the inner peripheral surface of the outer tube portion 12 in the clutch cylinder 1, and the seal lip 62 in the inner peripheral side is slidably brought into close contact with the outer peripheral surface of the inner tube portion 13 in the clutch cylinder 1.

Further, a plurality of projections 63 are formed at uniform intervals in a circumferential direction in a portion which is bonded to the pressure receiving portion 21 of the clutch piston 2, in the base portion 61 of the piston-integrated seal 6. The projections 63 prevent occlusion of the hydraulic chamber S1 by the close contact of the base portion 61 with the end plate portion 11 of the clutch cylinder 1 when the clutch piston 2 moves to its top dead center position.

Figure 2:
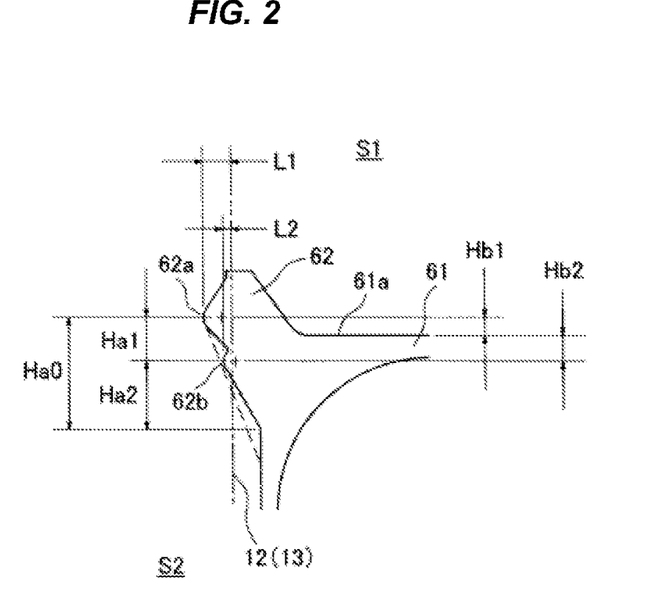
FIG. 2 is an explanatory view showing a substantial part of the preferable embodiment of the piston-integrated seal according to the present invention.

The seal lip 62 is structured, as shown in FIG. 2 in an enlarged manner, such that a main seal edge portion 62a in the hydraulic chamber S1 side and a sub seal edge portion 62b in the anti-hydraulic chamber side space S2 side are formed in a sliding portion with an inner peripheral surface of the outer tube portion 12 of the clutch cylinder 1 or an outer peripheral surface of the inner tube portion 13.

Describing in detail, a protruding height of the sub seal edge portion 62b is lower than a protruding height of the main seal edge portion 62a. As a result, an interference L2 of the sub seal edge portion 62b is set smaller than an interference L1 of the main seal edge portion 62a in relation to the inner peripheral surface of the outer tube portion 12 or the outer peripheral surface of the inner tube portion 13 of the clutch cylinder shown by a two-dot chain line in FIG. 2. Further, the protruding height of the sub seal edge portion 62b is formed to be lower than the inner peripheral surface of the conventionally shaped seal lip shown by a broken line in FIG. 2.

As shown in FIG. 2, a length Ha0 from the main seal edge portion 62a to the root portion in the anti-hydraulic chamber side space S2 side is shorter than a length Ha in an axial direction from the seal edge portion of the seal lip 101 according to the prior art shown in FIG. 5 which is previously described to the root portion in the anti-hydraulic chamber side space S2 side. Further, a length Ha1 in an axial direction between the main seal edge portion 62a and the sub seal edge portion 62b is shorter than a length Ha2 in an axial direction from the sub seal edge portion 62b to the root portion.

The main seal edge portion 62a exists only a distance Hb1 in an axial direction closer to the hydraulic chamber S1 side than a base portion surface 61a in the hydraulic chamber S1 side of the seal lip 62 in the base portion 61, however, the sub seal edge portion 62b exists only a distance Hb2 in an axial direction closer to an opposite side (the space S2 side) to the hydraulic chamber S1 than the base portion surface 61a. An expression Hb1+Hb2=Ha1 is established.

Figure 3:
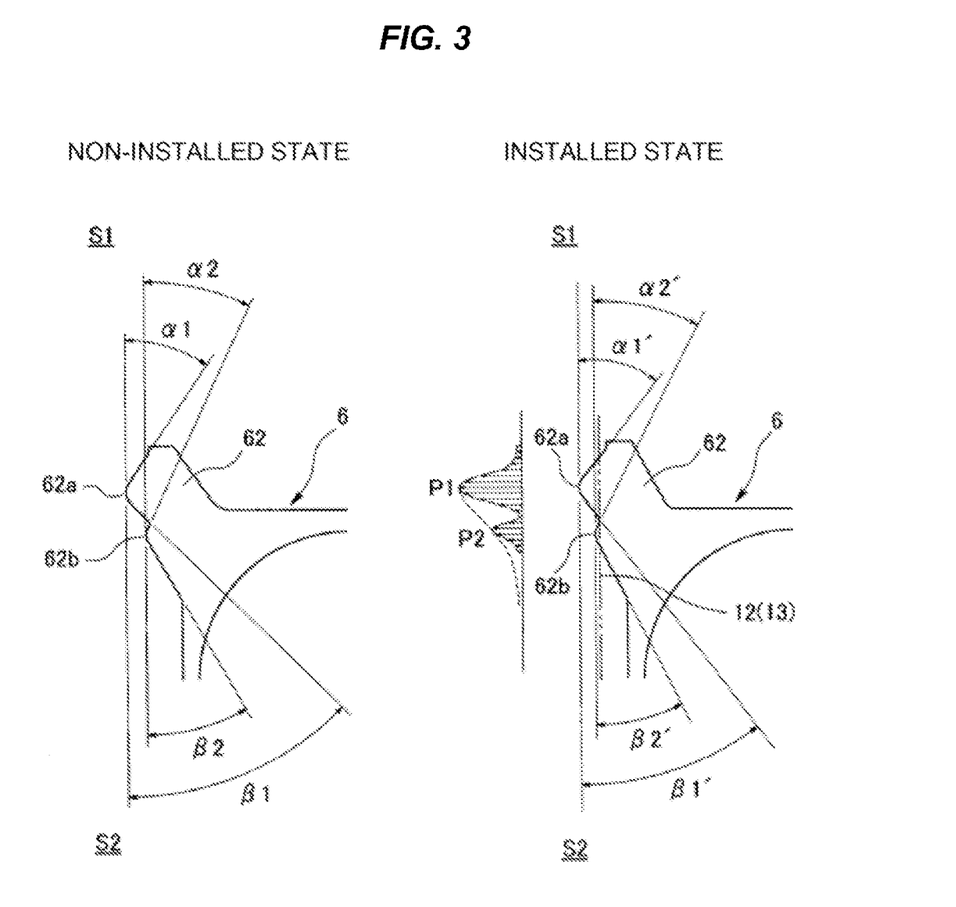
FIG. 3 is an explanatory view showing angles of included surface in a un-installed state and an installed state in the substantial part of the preferable embodiment of the piston-integrated seal according to the present invention.

Further, as shown in FIG. 3, the main seal edge portion 62a is formed so that an angle $\alpha 1$ of an inclined surface corresponding to the hydraulic chamber S1 side is smaller than an angle $\beta 1$ of an inclined surface corresponding to the opposite side (the space S2 side) to the hydraulic chamber S1 ($\alpha 1 < \beta 1$) under a un-installed state, and the sub seal edge portion 62b is formed so that an angle $\alpha 2$ of an inclined surface corresponding to the hydraulic chamber S1 side is smaller than an angle $\beta 2$ of an inclined surface corresponding to the opposite side (the space S2 side) to the hydraulic chamber S1 ($\alpha 2 < \beta 2$) under a un-installed state. Further, an expression $\alpha 1 > \alpha 2$ and an expression $\beta 1 > \beta 2$ are established.

As a result, since the seal lip 62 is exposed to a bending deformation around its root under the installed state, an angle $\alpha 1'$ which the inclined surface in the hydraulic chamber S1 side of the main seal edge portion 62a forms in relation to the inner peripheral surface of the outer tube portion 12 or the outer peripheral surface of the inner tube portion 13 in the clutch cylinder is increased somewhat in relation to $\alpha 1$, and an angle $\beta 1'$ which the inclined surface in the anti-hydraulic chamber side space S2 side forms is inversely reduced somewhat in relation to $\beta 1$. As a result, an expression $\alpha 1' \cong \beta 1'$ is established. Same applies to the sub seal edge portion 62b, an angle $\alpha 2'$ which the inclined surface in the hydraulic chamber S1 side forms is increased somewhat in relation to $\alpha 2$ under the installed state, and an angle $\beta 2'$ which the inclined surface in the anti-hydraulic chamber side space S2 side forms is inversely reduced somewhat in relation to $\beta 2$. As a result, an expression $\alpha 2' \cong \beta 2'$ is established.

Since the hydraulic clutch having the structure mentioned above applies the hydraulic pressure to the hydraulic chamber S1 via the pressure introduction port 14 or releases the hydraulic pressure, the clutch piston 2 displaces in the axial direction within the clutch cylinder 1, and the hydraulic clutch makes the multiple disc clutch 5 carry out a connecting action or a disconnecting action.

More specifically, in the case that the hydraulic chamber S1 is pressurized by feeding the oil (ATF), the clutch piston 2 displaces to a downward side in FIG. 1 (the anti-hydraulic chamber side space S2 side) while compressing the return spring 4, and the clutch pressing portion 24 of the clutch piston 2 presses the multiple disc clutch 5 so as to engage frictionally the drive plate 51 and the driven plate 52. As a result, the multiple disc clutch 5 comes to a connected state, and a driving torque from the drive shaft (not shown) side is transmitted to the driven shaft (not shown) via the clutch cylinder 1, and the drive plate 51, the driven plate 52 and the clutch hub 53 of the multiple disc clutch 5.

Further, in the case that the hydraulic pressure of the hydraulic chamber S1 is released from the connected state, the clutch piston 2 displaces upward in FIG. 1 on the basis of the elongation of the compressed return spring 4 so as to reduce the cubic capacity of the hydraulic chamber S1, and cancels the pressure application to the multiple disc clutch 5. As a result, the friction engagement between the drive plate 51 and the driven plate 52 of the multiple disc clutch 5 is canceled, and the transmission of the driving torque from the drive shaft to the driven shaft is disconnected.

In the displacement of the clutch piston 2 mentioned above, in the piston-integrated seal 6 integrally provided in the clutch piston 2, the seal lips 62 in its inner and outer peripheries come into close contact with and slides along the inner peripheral surface of the outer tube portion 12 and the outer peripheral surface of the inner tube portion 13 of the clutch cylinder 1. Further, since the main seal edge portion 62a in the hydraulic chamber S1 side and the sub seal edge portion 62b in the anti-hydraulic chamber side space S2 side are formed in the sliding portion, the contact area with the outer tube portion 12 and the inner tube portion 13 of the clutch cylinder 1 becomes smaller. In addition, since the thickness of the seal lip 62 is reduced as a whole in comparison with the conventional shape shown by a broken line in FIG. 2, the rigidity is lowered. As a result, the contact pressures P1 and P2 by the main seal edge portion 62a and the sub seal edge portion 62b shown in FIG. 3 become smaller as a whole in comparison with the conventional contact pressure shown by the broken line. Further, since the portion between both the seal edge portions 62a and 62b serves as the lubrication groove, the friction can be effectively reduced.

Further, in a state in which the seal lip 62 comes into contact with the inner peripheral surface of the outer tube portion 12 or the outer peripheral surface of the inner tube portion 13 in the clutch cylinder as shown by [installed state] in FIG. 3, the angle α1' of the inclined surface in the hydraulic chamber S1 side of the main seal edge portion 62a is approximately equal to the angle β1' of the inclined surface in the anti-hydraulic chamber side space S2 side, and the angle α2' of the inclined surface in the hydraulic chamber S1 side of the sub seal edge portion 62b is approximately equal to the angle β2' of the inclined surface in the anti-hydraulic chamber side space S2 side. As a result, the contact pressures P1 and P2 of the main seal edge portion 62a and the sub seal edge portion 62b in relation to the inner peripheral surface of the outer tube portion 12 or the outer peripheral surface of the inner tube portion 13 in the clutch cylinder distribute respectively approximately and symmetrically with each other in the hydraulic chamber S1 side and the anti-hydraulic chamber side space S2 side. Therefore, it is possible to effectively reduce the difference between the friction at the stroking time of the clutch piston 2 to the anti-hydraulic chamber side space S2 side (the direction of pressing the multiple disc clutch 5), and the friction at the stroking time of the clutch piston 2 to the hydraulic chamber S1 side (the direction of canceling the pressure application to the multiple disc clutch 5). As a result, it is possible to improve the shift change response of the hydraulic clutch.

Further, since the interference L2 of the sub seal edge portion 62b is set to be smaller than the interference L1 of the main seal edge portion 62a in relation to the inner peripheral surface of the outer tube portion 12 or the outer peripheral surface of the inner tube portion 13 in the clutch cylinder, as shown in FIG. 2, the deformation of the main seal edge portion 62a can be absorbed by the sub seal edge portion 62b. As a result, the change of the contact load of the main seal edge portion 62a can be suppressed regardless of the change of the hydraulic pressure of the hydraulic chamber S1 applied to the seal lip 62, and the difference in friction mentioned above can be reduced thereby.

Further, since the sub seal edge portion 62b is positioned only the distance Hb2 in the axial direction closer to the anti-hydraulic chamber side space S2 side than the base portion surface 61a in the hydraulic chamber S1 side of the seal lip 62 in the base portion 61, the deformation of the sub seal edge portion 62b caused by applying the hydraulic pressure to the hydraulic chamber S1 is suppressed. As a result, a deformation suppressing action of the seal lip 62 by the sub seal edge portion 62b is enhanced. Further, since the length Ha0 itself from the main seal edge portion 62a to the root portion in the anti-hydraulic chamber side space S2 side is made shorter than the conventional one shown in FIG. 5, it is possible to improve the pressure resistance in spite of the matter that the thickness of the seal lip 62 is smaller than the conventional one.

What is claimed is:

1. A piston-integrated seal comprising:
    a seal lip which is integrally provided in a clutch piston of a hydraulic clutch and is directed to a hydraulic chamber side,
    wherein the seal lip is structured such that a main seal edge portion on a hydraulic chamber side of the seal lip and a sub seal edge portion on an anti-hydraulic chamber side of the seal lip are formed in a sliding portion in relation to another sliding surface,
    wherein the main seal edge portion has a first inclined surface on the hydraulic chamber side and a second inclined surface on the anti-hydraulic chamber side and is structured such that;
        in an un-installed state, an angle α1 of the first inclined surface is smaller than an angle β1 of the second inclined surface, and
        in an installed state, an angle α1' of the first inclined surface in relation to the other sliding surface is approximately equal to an angle β1' of the second inclined surface in relation to the other sliding surface , and
    wherein the sub seal edge portion has a third inclined surface on the hydraulic chamber side and a fourth inclined surface on the anti-hydraulic chamber side and is structured such that:
        in an un-installed state, an angle α2 of the third inclined surface is smaller than an angle β2 of the fourth inclined surface, and
        in an installed state, an anole α2' of the third inclined surface in relation to the other sliding surface is approximately equal to an angle β2' of the fourth inclined surface in relation to the other sliding surface.

2. The piston-integrated seal according to claim 1, wherein an interference of the sub seal edge portion is smaller than an interference of the main seal edge portion.

3. The piston-integrated seal according to claim 1, wherein the sub seal edge portion is positioned closer to the anti-hydraulic chamber side than a surface of a base portion in the hydraulic chamber side of the seal lip.

4. The piston-integrated seal according to claim 2, wherein the sub seal edge portion is positioned closer to the anti-hydraulic chamber side than a surface of a base portion in the hydraulic chamber side of the seal lip.

* * * * *